US 12,124,573 B1

United States Patent
Lim et al.

(10) Patent No.: US 12,124,573 B1
(45) Date of Patent: Oct. 22, 2024

(54) EVENT PROCESSING METHOD AND SYSTEM

(71) Applicant: KOREA INTERNET & SECURITY AGENCY, Naju-si (KR)

(72) Inventors: Joon Hyung Lim, Naju-si (KR); Tae Eun Kim, Naju-si (KR); Ki Jong Son, Naju-si (KR); Sae Woom Lee, Naju-si (KR); Seul Ki Choi, Naju-si (KR); Tae Hyeon Kim, Naju-si (KR)

(73) Assignee: KOREA INTERNET & SECURITY AGENCY, Naju-si (KR)

( * ) Notice: Subject to any disclaimer, the term of this patent is extended or adjusted under 35 U.S.C. 154(b) by 0 days.

(21) Appl. No.: 18/420,905

(22) Filed: Jan. 24, 2024

(30) Foreign Application Priority Data

Sep. 25, 2023 (KR) .......................... 10-2023-0128230

(51) Int. Cl.
*G06F 21/55* (2013.01)
(52) U.S. Cl.
CPC .................................. *G06F 21/554* (2013.01)
(58) Field of Classification Search
CPC ....................................................... G06F 21/554
USPC ......................................................... 726/23
See application file for complete search history.

(56) References Cited

U.S. PATENT DOCUMENTS

| | | | |
|---|---|---|---|
| 9,166,997 B1* | 10/2015 | Guo | G06F 21/554 |
| 2009/0089138 A1* | 4/2009 | Minert | G06Q 10/063112 |
| | | | 705/7.42 |
| 2010/0325726 A1* | 12/2010 | Aoki | G06F 21/316 |
| | | | 726/22 |
| 2020/0177636 A1 | 6/2020 | Linn et al. | |

FOREIGN PATENT DOCUMENTS

| | | |
|---|---|---|
| KR | 10-2240514 B1 | 4/2021 |
| KR | 10-2022-0074531 A | 6/2022 |
| KR | 10-2420239 B1 | 7/2022 |
| KR | 10-2433831 B1 | 8/2022 |
| KR | 10-2516819 B1 | 4/2023 |

* cited by examiner

*Primary Examiner* — Anthony D Brown
(74) *Attorney, Agent, or Firm* — Studebaker & Brackett PC

(57) ABSTRACT

An event processing method performed by a computing device is provided. The method may comprise receiving a plurality of events and generating a first event sequence in which the received events are sequentially arranged, determining first priorities for the events included in the first event sequence, using data output from a previously trained priority decision model, verifying the first priorities by comparing the first priorities with second priorities for the events included in the first event sequence, determining a feedback score for the first priorities based on results of the verification; and reinforcing the training of the priority decision model using the feedback score.

16 Claims, 10 Drawing Sheets

EVENT PROCESSING METHOD AND SYSTEM

CROSS-REFERENCE TO RELATED APPLICATION

This application claims priority from Korean Patent Application No. 10-2023-0128230 filed on Sep. 25, 2023, in the Korean Intellectual Property Office, and all the benefits accruing therefrom under 35 U.S.C. 119, the contents of which in its entirety are herein incorporated by reference.

BACKGROUND

1. Field

The present disclosure relates to an event processing method and system, and more particularly, to a method and system for predicting and verifying processing priorities among events during the processing of events in an artificial intelligence (AI)-based security control environment.

2. Description of the Related Art

Recently, the frequency and sophistication of cyberattacks have been increasing. Cyberattacks originating from operational systems and personal computer (PC) terminals are expanding to all devices connected to the Internet, and a large number of security events are being collected through various security solutions.

In a security control environment, it takes an average of more than ten minutes for a person to analyze a single threat event, and additional time may be required depending on the importance of the threat event. The analysis of threat events by individuals leads to an excessive workload increase due to the growing number of repetitive analysis and response actions, and consistent responses are challenging due to the varied approaches and time taken by different analysts, influenced by their individual know-hows and experiences.

Moreover, although there are many collected events that can be simply processed, high-risk events can cause critical damage to operational and internal systems. Therefore, security devices need to quickly select and prioritize high-risk events for processing.

As a result, there is a need for a technology that determines processing priorities among events when events to be processed by security devices accumulate, and verifies whether the determined processing priorities are appropriate.

SUMMARY

Aspects of the present disclosure provide an event processing method and system that measure the risk levels of security control events occurring in an artificial intelligence (AI)-based security control environment and determine processing priorities among the security control events.

Aspects of the present disclosure also provide an event processing method and system that verify processing priorities among events determined through an AI-based priority decision model, and use the results of the verification to perform the reinforced training of the priority decision model.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided an event processing method performed by a computing device. The method may comprise receiving events, determining, by the computing device, whether an event processing threshold exceedance has occurred due to the reception of the events, if it is determined that the event processing threshold exceedance has occurred, determining processing priorities for the received events and if the processing priorities of the received events are below a predetermined reference level, deciding to delay the processing of the received events.

In some embodiments, the events may be security control events occurring in a security control environment, and the determining the processing priorities for the received events, may comprise creating, by the computing device, a first score for the risk level of each of the events, a second score for the importance of detection equipment, and a third score for the frequency of attacks targeted at a destination IP address of each of the events; calculating a first item by multiplying the first score with a first weight, a second item by multiplying the second score with a second weight, and a third item by multiplying the third score with a third weight, wherein a sum of the first, second, and third weights is equal to 1; and assigning higher priorities to events with larger sums of the first, second, and third items.

In some embodiments, the creating the first score may comprise calculating the first score using an arithmetic mean value of 'Damage potential,' 'Reproducibility,' 'Exploitability,' 'Affected users,' and 'Discoverability' values for each of the events.

According to another aspect of the present disclosure, there is provided an event processing method performed by a computing device. The method may comprise receiving a plurality of events and generating a first event sequence in which the received events are sequentially arranged, determining first priorities for the events included in the first event sequence, using data output from a previously trained priority decision model, verifying the first priorities by comparing the first priorities with second priorities for the events included in the first event sequence, determining a feedback score for the first priorities based on results of the verification; and reinforcing the training of the priority decision model using the feedback score.

In some embodiments, the determining the first priorities, may comprise creating a first score for the risk level of each of the events included in the first event sequence, a second score for the importance of detection equipment, and a third score for the frequency of attacks targeted at a destination IP address of each of the events included in the first event sequence; calculating a first item by multiplying the first score with a first weight, a second item by multiplying the second score with a second weight, and a third item by multiplying the third score with a third weight, wherein the sum of the first, second, and third weights is equal to 1; and assigning higher priorities to events with larger sums of the first, second, and third items.

In some embodiments, the creating the first score, may comprise creating the first score using an arithmetic mean value of 'Damage potential,' 'Reproducibility,' 'Exploitability,' 'Affected users,' and 'Discoverability' values for each of the events included in the first event sequence.

In some embodiments, the second priorities may be determined using data entered by a user terminal based on the risk level, playbook execution time, and frequency of occurrence of each of the events included in the first event sequence.

In some embodiments, the verifying the first priorities, may comprise generating a second event sequence with event order information for each of the events included in the first event sequence, by arranging the events included in the first event sequence in descending order of the first priorities; generating a third event sequence with event order information for each of the events included in the first event sequence, by arranging the events included in the first event sequence in descending order of the second priorities; and instructions for determining whether the event order information for an m-th event (where m is an integer of 1 or greater) in the third event sequence matches the event order information for the same event in the second event sequence.

In some embodiments, the determining the feedback score, may comprise adding (maximum feedback score/N) to the feedback score if event order information for a first event in the third event sequence matches event order information for the same event in the second event sequence, wherein N is a number of events included in the first event sequence.

In some embodiments, the determining the feedback score, may comprise adding {(maximum feedback score/N)×(event order information for first event in third event sequence−event order information for same event in second event sequence)} to the feedback score if the event order information for the first event in the third event sequence does not match the event order information for the same event in the second event sequence, wherein N is a number of events included in the first event sequence.

In some embodiments, the determining the feedback score, may comprise adding (maximum feedback score/N) to the feedback score if event order information for an i-th event (where i is an integer of 2 or greater) in the third event sequence matches event order information for the same event in the second event sequence, wherein N is a number of events included in the first event sequence.

In some embodiments, the determining the feedback score, may comprise if event order information for an i-th event (where i is an integer of 2 or greater) in the third event sequence does not match event order information for the same event in the second event sequence, computing a first difference value, which is a difference between event order information for a first event in the second event sequence that corresponds to an (i−1)-th event in the third event sequence and event order information for a second event in the second event sequence that corresponds to the i-th event in the third event sequence, and calculating the feedback score using the first difference value.

In some embodiments, the calculating the feedback score, may comprise if the first difference value is negative, adding {(maximum feedback score/N)×1/(event order information for second event in second event sequence−event order information for first event in second event sequence)} to the feedback score, wherein N is a number of events in the first event sequence.

In some embodiments, the calculating the feedback score, may comprise if the first difference value is positive, adding {(maximum feedback score/N)×(event order information for second event in second event sequence corresponding to the i-th event in the third event sequence−event order information for first event in second event sequence corresponding to (i−1)-th event in third event sequence)} to the feedback score, wherein N is a number of events in the first event sequence.

In some embodiments, the determining the feedback score, may comprise if the second priorities do not match the second priorities, determining a degree of mismatch between priorities that has multiple values, if the degree of mismatch between priorities has a first value, determining the feedback score as a first feedback score, and if the degree of mismatch between priorities has a second value, determining the feedback score as a second feedback score.

According to still another aspect of the present disclosure, there is provided an event processing system. The system may comprise a communication interface, a memory having a computer program loaded therein and at least one processor executing the computer program, wherein the computer program executes: instructions for receiving events; instructions for determining whether an event processing threshold exceedance has occurred due to the reception of the events; instructions for determining processing priorities for the received events if it is determined that the event processing threshold exceedance has occurred; and instructions for deciding to delay the processing of the received events, if the processing priorities of the received events are below a predetermined reference level.

According to still another aspect of the present disclosure, there is provided an event processing system. The system may comprise a communication interface, a memory having a computer program loaded therein; and at least one processor executing the computer program, wherein the computer program executes: instructions for receiving a plurality of events and generating a first event sequence in which the received events are sequentially arranged; instructions for determining first priorities for the events included in the first event sequence, using data output from a previously trained priority decision model; instructions for verifying the first priorities by comparing the first priorities with second priorities for the events included in the first event sequence; instructions for determining a feedback score for the first priorities based on results of the verification; and instructions for reinforcing the training of the priority decision model using the feedback score.

According to still another aspect of the present disclosure, there is provided an event processing system. The system may comprise a server outputting a plurality of events generated by an external attack, security equipment collecting the events from the server to perform a security control process, and sending a support request signal to a security control decision support system if a number of occurred events exceeds an event processing threshold and the security control decision support system receiving the support request signal, determining priorities for the events, verifying the determined priorities, and transmitting information on the verified priorities to the security equipment.

In some embodiments, the security control decision support system may further receive the events from the security equipment, generates a first event sequence where the events are sequentially arranged, determines first priorities for the events included in the first event sequence, and verifies the first priorities by comparing the first priorities with second priorities for the events included in the first event sequence, and the first priorities are determined data output from a previously trained priority decision model.

In some embodiments, the security control decision support system may determine a feedback score for the first priorities using results of the verification and performs reinforced learning for the priority decision model using the feedback score.

According to the aforementioned and other embodiments of the present disclosure, by measuring the risk levels of security control events occurring in an AI-based security control environment and determining processing priorities among the security control events, high-risk events can be quickly selected and prioritized for processing.

Moreover, processing priorities among events determined through an AI-based priority decision model can be verified, and the results of the verification can be used to perform the reinforced training of the priority decision model.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
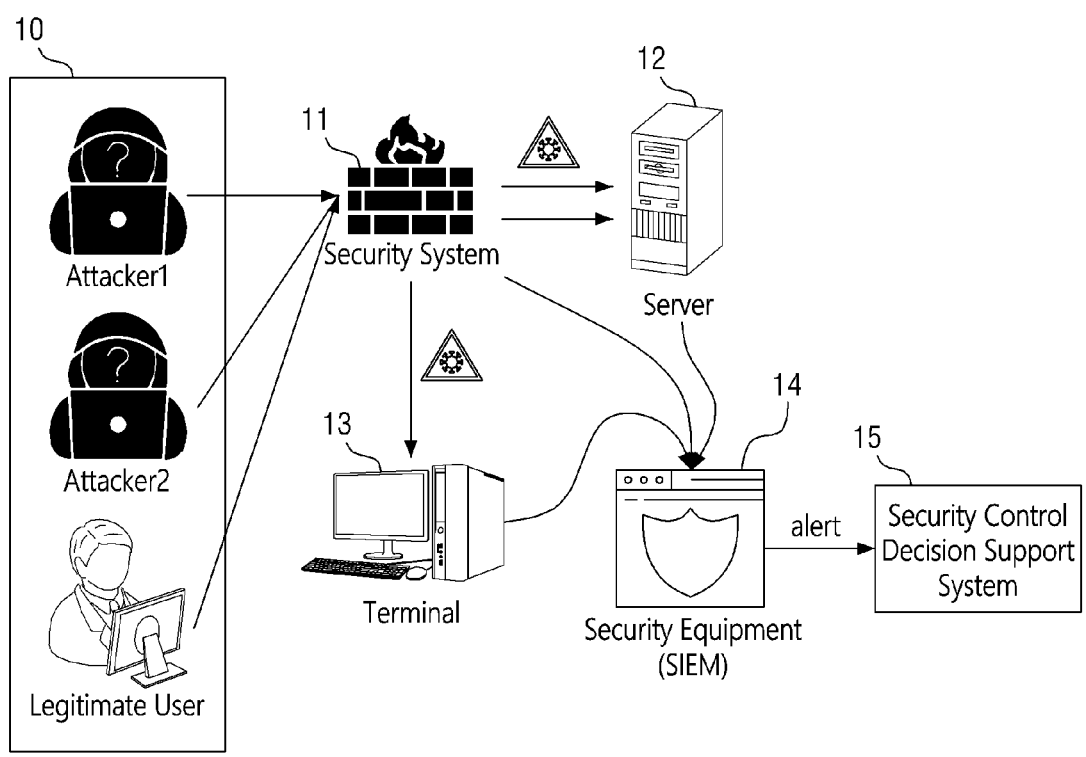
FIG. 1 is a schematic view illustrating an event processing system according to an embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

The configuration and operation of an event processing system according to an embodiment of the present disclosure will hereinafter be described with reference to FIG. 1.

As illustrated in FIG. 1, the event processing system may include a security system 11, a server 12, security equipment 14, and a security control decision support system 15.

Referring to FIG. 1, some of users 10 who access an internal or external systems of an organization may be attackers targeting the organization's system, while others may be legitimate users. When the terminals of the users 10 access the internal or external system of the organization, events occur in devices such as the security system 11, which is like a firewall, the server 12, or a terminal 13. If an event occurs and if the event matches a predefined detection pattern or rule, the security equipment 14, such as a Security Information and Event Management (SIEM), generates an alert to inform the event processing system, which includes the security control decision support system 15, about the occurrence of the event.

Alerts generated by the security equipment 14 are received by the security control decision support system 15, and among the generated alerts, there may be normal alerts and malicious alerts. If the number of occurred events does not exceed the event processing threshold of the security equipment 14, the security equipment 14 may process the occurred events in order. However, there may be cases where the number of occurred events exceeds the event processing threshold of the security equipment 14. For example, if the security equipment 14 is capable of handling 100 events at the same time and 1000 events occur when a series of security-related issues arise, there is a need to quickly select and process high-risk events that can cause critical damage to the internal or external system of the organization.

Therefore, when the number of occurred events exceeds the event processing threshold of the security equipment 14, there is a need for a technology that can determine processing priorities among the occurred events and process the occurred events according to the determined processing priorities.

To this end, the security equipment 14 may collect a plurality of events from the server 12 and perform a security control process. If the number of occurred events exceeds the event processing threshold of the security equipment 14, the security equipment 14 may send a support request signal to the security control decision support system 15.

The security control decision support system 15 may receive the support request signal, determine the priorities of the occurred events, verify the determined priorities, and transmit information regarding the verified priorities to the security equipment 14.

In some embodiments, the security control decision support system 15 may further receive a plurality of events from the security equipment 14 and generate a first event sequence in which the received events are sequentially arranged.

Additionally, the security control decision support system 15 determines first priorities of the events included in the first event sequence and may verify the first priorities by comparing them with second priorities of the events included in the first event sequence.

Here, the first priorities may be priorities determined using data output from a previously trained priority decision model.

The security control decision support system 15 may determine a feedback score for the first priorities using the results of the verification and may perform the reinforced training of the priority decision model using the determined feedback score.

In situations of massive attacks on the server 12, the security system 11, and the terminal 13, leading to an overwhelming number of events for the security equipment 14 to handle, the event processing system can process notable events first based on their priorities when the number of occurred events exceeds a predetermined threshold. Accordingly, the event processing system can provide the effect of stable event processing even during massive attack situations while minimizing human intervention.

A processing method according to an embodiment of the present disclosure will hereinafter be described with reference to FIGS. 2 and 3.

Figure 2:
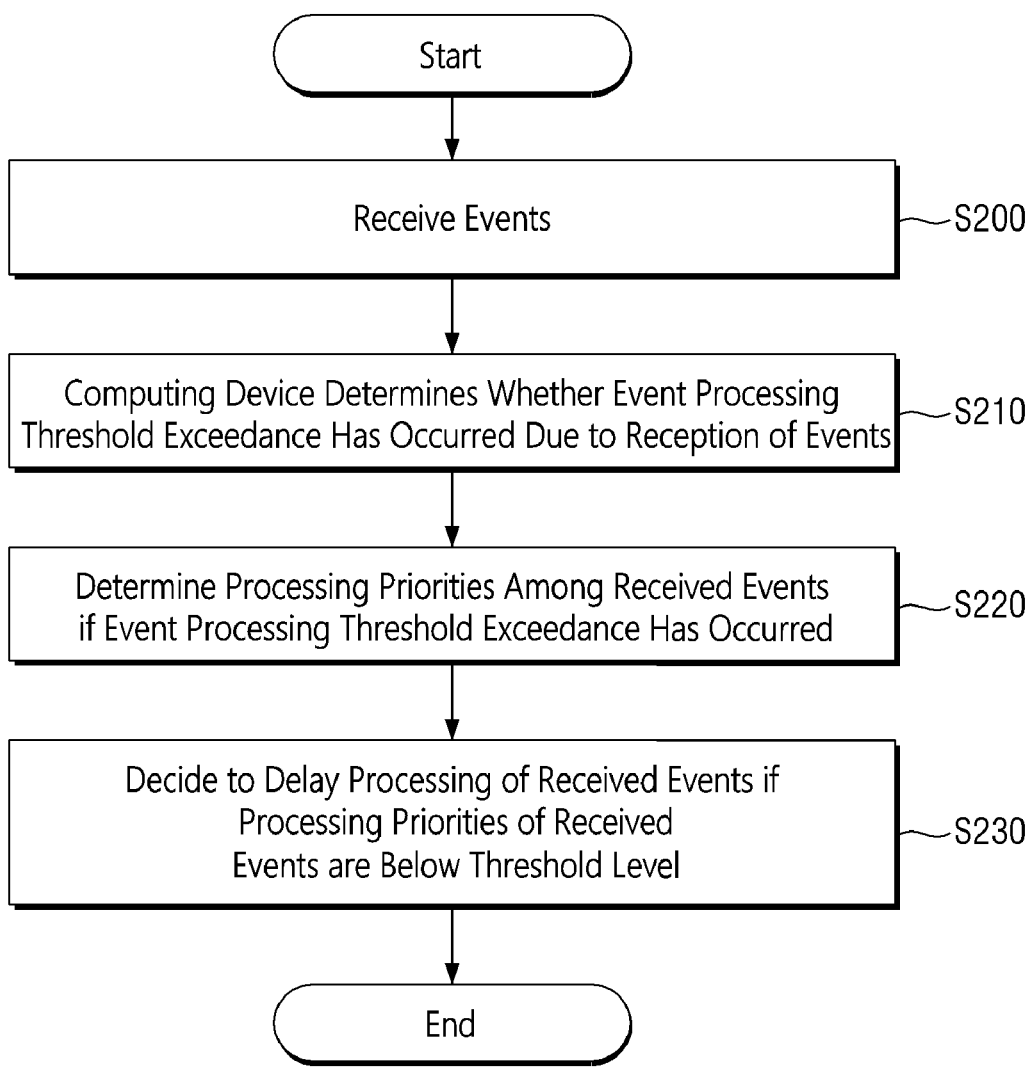
FIG. 2 is a flowchart illustrating an event processing method according to an embodiment of the present disclosure.

FIG. 2 is a flowchart illustrating an event processing method according to an embodiment of the present disclosure.

The event processing method of FIG. 2 may be performed by at least one computing system. Additionally, some operations of the event processing method of FIG. 2 may be performed by a first computing device included in the computing system, and the remaining operations may be performed by a second computing device included in the computing system. For example, some operations of the event processing method of FIG. 2 may be performed by an on-premise physical server, and the remaining operations may be performed by a cloud compute instance. In the description that follows, although not explicitly mentioned, each operation of the event processing method of FIG. 2 may be understood as being performed by the computing system.

Referring to FIG. 2, the security control decision support system 15 may receive events from the security equipment 14 (S200).

When the security control decision support system 15 receives events from the security equipment 14, the security control decision support system 15 may determine whether the number of received events exceeds the event processing threshold of the security equipment 14 (S210). For example, if the security equipment 14 is capable of handling 100 events at the same time and 1000 events occur when a series of security-related issues arise, the security control decision support system 15 may determine whether the number of occurred events exceeds the event processing threshold of the security equipment 14 by comparing the number of events that can be processed simultaneously by the security equipment 14 with the number of occurred events.

Thereafter, if the security control decision support system 15 determines that the number of received events exceeds the event processing threshold of the security equipment 14, the security control decision support system 15 may determine processing priorities for the received events (S220). A method by which the security control decision support system 15 determines the processing priorities for the received events will be described later in detail with reference to FIG. 3.

Thereafter, if the processing priorities for the received events are below a predetermined reference level, the security control decision support system 15 may decide to delay the processing of the received events (S230).

Steps S220 and S230 will be further elaborated using the aforementioned example, where the security equipment 14 is capable of handling 100 events at the same time and receives 1000 events, and it is assumed that the security control decision support system 15 assigns processing priorities from 1 to 1000 to the 1000 received events. In this case, the security control decision support system 15 may decide to have events ranked first to $100^{th}$ in processing priority processed as a top priority by the security equipment 14 to guide the security equipment 14 to process the received events according to their processing priorities. On the contrary, the security control decision support system 15 may decide to delay the processing of events ranked from $101^{st}$ to $1000^{th}$ in processing priority by the security equipment 14 to enable the security equipment 14 to process the received events according to their processing priorities.

According to this embodiment, high-risk events can be quickly selected and processed as a priority by determining processing priorities among events occurring in an AI-based security control environment. Therefore, the security equipment 14 can prioritize the processing of critical events involved in cyberattacks or other malicious attacks, thereby ensuring the stability of a system.

The method by which the security control decision support system 15 determines the processing priorities for the received events will hereinafter be described with reference to FIG. 3.

Figure 3:
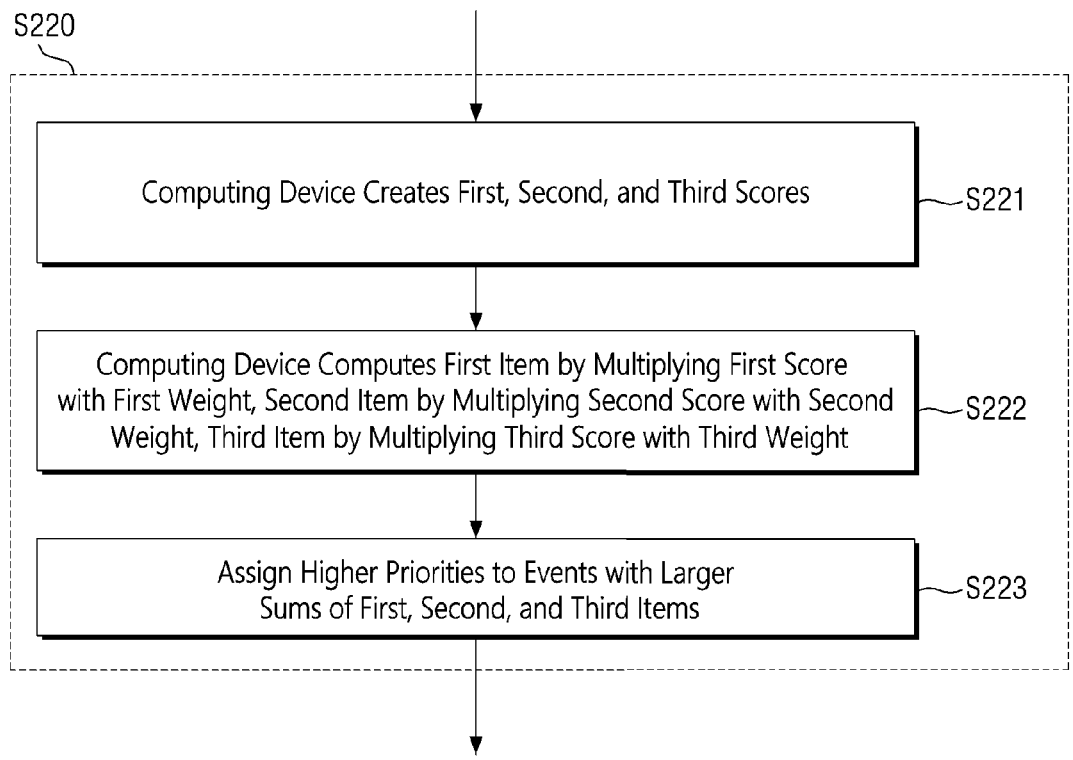
FIG. 3 is a detailed flowchart further elaborating the event processing method of FIG. 2.

FIG. 3 is a detailed flowchart further elaborating the event processing method of FIG. 2.

Referring to FIG. 3, for each of the events received from the security equipment 14, the security control decision support system 15 may create a first score for the risk level of each event, a second score for the importance of detection equipment that has detected each event, and a third score for the frequency of attacks attempted on the destination IP address of each event (S221).

The first score may be generated using the arithmetic mean value of at least some of 'Damage potential,' 'Reproducibility,' 'Exploitability,' 'Affected users,' and 'Discoverability' values for each event. 'Damage potential,' 'Reproducibility,' 'Exploitability,' 'Affected users,' and 'Discoverability' are five items of a DREAD scoring policy, which is a conventional technique for calculating the risk levels of events in the field of security control. Each of these items of the DREAD scoring policy is rated on a scale from 0 to 10, where scores closer to 0 indicate lower severity or probability of occurrence, and scores closer to 10 indicate higher severity or probability of occurrence.

The 'Damage potential (D)' value is an indicator of how severe damage caused by each event can be. The 'Reproducibility (R)' value is an indicator of the success probability of an attack. The 'Exploitability (E)' value indicates how much effort is required to mount an attack. The 'Affected users (A)' value is an indicator of how many people can be affected by an attack. The 'Discoverability (D)' value is an indicator of how easy it is to discover vulnerabilities in an attack.

Each of these five items of the DREAD scoring policy may be scored differently by different control centers, and when using data from multiple security control centers, the average of the risk levels of an event calculated by the multiple security control centers may be used as the first score.

The second score may be calculated by reflecting the level of importance set by a control center that has detected the events received from the security equipment 14. In this case, the second score may be rated on a scale from 0 to 10. Event detection equipment includes a security solution such as a firewall (FW), an intrusion detection system (IDS), or an intrusion prevention system (IPS). As the security solution is a conventional technology for event detection in the field of security control and is already well-known to one of ordinary skill in the art to which the present disclosure pertains, a further detailed explanation of the security solution will be omitted.

The third score for the frequency of attacks attempted on the destination IP address of each event may also be rated on a scale from 0 to 10.

After generating the first, second, and third scores, the security control decision support system 15 may calculate a first item by multiplying the first score with a first weight, a second item by multiplying the second score with a second weight, and a third item by multiplying the third score with a third weight (S222). The sum of the first, second, and third weights is equal to 1. The security control decision support system 15 may adjust the criterion for determining processing priorities by assigning different weights to each of the first, second, and third scores according to policy.

Thereafter, the security control decision support system 15 may assign higher priorities to events with larger sums of the first, second, and third items (S223).

According to this embodiment, high-risk events can be quickly selected and processed as a priority by determining processing priorities among security control events occurring in an AI-based security control environment based on the risk levels of the security control events, the importance of detection/security equipment that has detected the security control events, and the frequencies of attacks on the destination IP addresses of the security control events. Therefore, the security equipment 14 can prioritize the processing of critical events involved in cyberattacks or other malicious attacks, thereby ensuring the stability of a system.

In an AI-based security control environment, even after the security control decision support system 15 determines the processing priorities among the events received from the security equipment 14, it is necessary to verify the accuracy of the determined processing priorities. The security control decision support system 15 may verify the accuracy of the determined processing priorities and use the results of the verification to perform the reinforced training of a priority decision model. Then, the priority decision model can more accurately predict processing priorities for events, thus necessitating a technology that allows the security control decision support system 15 to verify the determined processing priorities.

A method for the security control decision support system 15 to determine and verify the accuracy of processing priorities among the events received from the security equipment 14 will hereinafter be described with reference to FIGS. 4 to 9.

Figure 4:
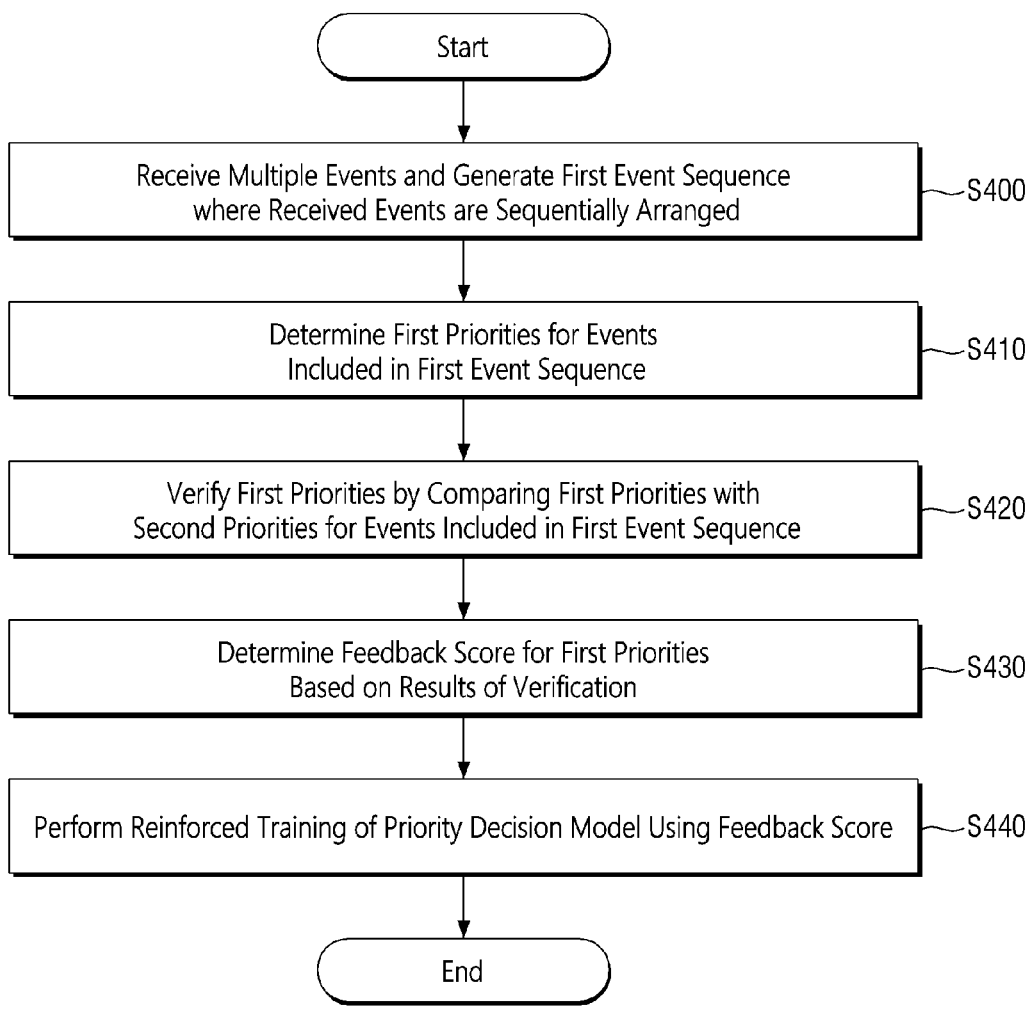
FIG. 4 is a flowchart illustrating an event processing method according to another embodiment of the present disclosure.

FIG. 4 is a flowchart illustrating an event processing method according to another embodiment of the present disclosure.

Referring to FIG. 4, the security control decision support system 15 may receive a plurality of events from the security equipment 14 and generate a first event sequence in which the received events are sequentially arranged (S400). The first event sequence is a sequence in which events are arranged in the order they are received.

Thereafter, the security control decision support system 15 may determine first priorities for the events included in the first event sequence (S410). The first priorities may be determined using data output from a previously trained priority decision model.

Figure 5:
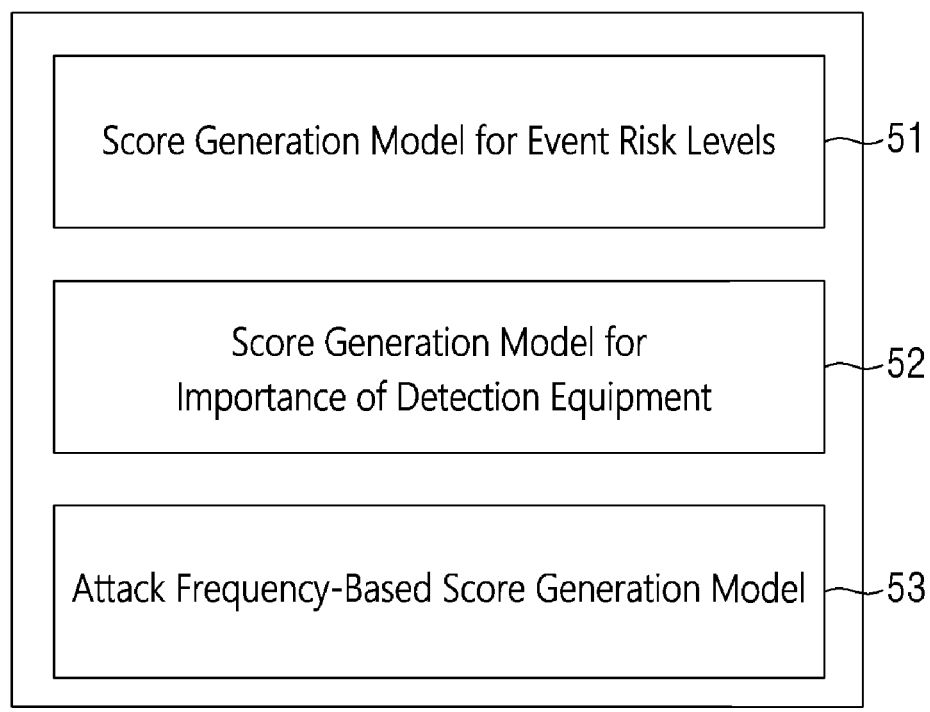
FIG. 5 is a configuration view illustrating a priority decision model according to some embodiments of the present disclosure.

A priority decision model will hereinafter be described with reference to FIG. 5. FIG. 5 is a configuration view illustrating a priority decision model according to some embodiments of the present disclosure.

Referring to FIG. 5, a priority decision model 50 may include a score generation model 51 for event risk levels, a score generation model 52 for the importance of detection equipment, and an attack frequency-based score generation model 53. Processing priorities among events that are determined by the priority decision model 50 may be verified later according to a verification algorithm, and the models 51, 52, and 53 included in the priority decision model 50 may be subjected to reinforced training with the results of the verification. Therefore, there is an effect of continuously improving the accuracy of the processing priorities among the events that are determined by the priority decision model 50 through the reinforced training of the models 51, 52, and 53.

The determination of processing priorities among events and the verification of the accuracy of the determined processing priorities will be continued with reference to FIG. 4.

Once the security control decision support system 15 determines first priorities for the events included in the first event sequence (S410), the security control decision support system 15 may verify the first priorities through comparison with second priorities for the events included in the first event sequence (S420).

The second priorities may be determined using data entered by a user terminal based on the risk level, playbook execution time, and frequency of occurrence of each of the events included in the first event sequence. In other words, the second priorities may be the actual processing priorities of the events included in the first event sequence and may serve as answer keys entered by a user. By comparing the first priorities and the second priorities, the security control decision support system 15 may verify the accuracy of the first priorities. As the user provides the second priorities, the security control decision support system 15 can more accurately verify the first priorities determined by the priority decision model 50.

After verifying the first priorities (S420), the security control decision support system 15 may determine a feedback score for the first priorities using the results of the verification (S430). The feedback score for the first priorities may be used later for a reinforced learning for the priority decision model 50 (S430). A method for determining the feedback score for the first priorities will be described later.

According to this embodiment, processing priorities among events that are determined through an AI-based priority decision model can be verified, and the results of the verification can be used to perform the reinforced training of the priority decision model. Therefore, by continuously reinforcing the training of the priority decision model, the reliability of the determined processing priorities is ensured, and the security equipment 14 can prioritize critical events involved in cyberattacks or other malicious attacks as a top priority based on the determined processing priorities, thereby ensuring the stability of a system.

A method by which the security control decision support system 15 determines the first priorities for the events included in the first event sequence will hereinafter be described.

First, the security control decision support system 15 may generate first, second, and third scores for each of the events included in the first event sequence. The details of the first score, second score, and third score have already been described above with reference to FIG. 3, and thus, descriptions thereof will be omitted.

Thereafter, the security control decision support system 15 may compute a first item by multiplying the first score with a first weight, compute a second item by multiplying the second score with a second weight, and compute a third item by multiplying the third score with a third weight (S222). The sum of the first, second, and third weights is equal to 1. The security control decision support system 15 may adjust the criterion for determining processing priorities by assigning different weights to each of the first, second, and third scores according to policy.

Thereafter, the security control decision support system 15 may assign higher priorities to events with larger sums of the first, second, and third items.

According to this embodiment, high-risk events can be quickly selected and processed as a priority by determining processing priorities among security control events occurring in an AI-based security control environment based on the risk levels of the security control events, the importance of detection/security equipment that has detected the security control events, and the frequencies of attacks on the destination IP addresses of the security control events. Therefore, the security equipment 14 can prioritize the processing of critical events involved in cyberattacks or other malicious attacks, thereby ensuring the stability of a system.

A method by which the security control decision support system 15 verifies the first priorities will hereinafter be described with reference to FIG. 6.

Figure 6:
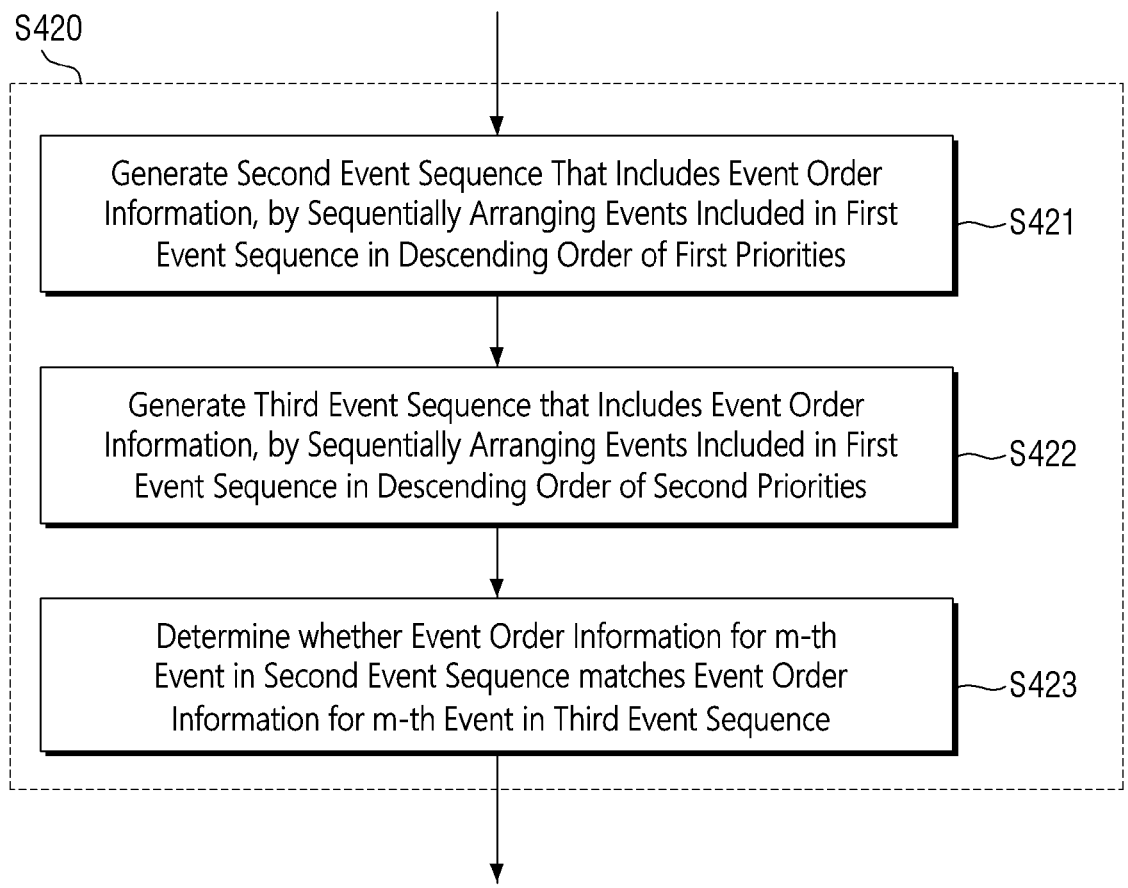
FIGS. 6 through 8 are detailed flowcharts further elaborating the event processing method of FIG. 4.

FIG. 6 is a detailed flowchart further elaborating the event processing method of FIG. 4.

Specifically, FIG. 6 illustrates how the security control decision support system 15 verifies the first priorities for the events included in the first event sequence by comparing the second priorities with the first priorities.

Referring to FIG. 6, the security control decision support system 15 may sort the events included in the first event sequence in descending order of the first priorities, thereby creating a second event sequence with event order information for each of the events included in the first event sequence (S421). The event order information included in the second event sequence is order information sequentially assigning processing priorities, starting from 1, according to the first priorities.

For example, it is assumed that events A, B, C, D, and E are received by the security control decision support system 15 in the order of E, D, C, B, and A. Since events A, B, C, D, and E are arranged in the first event sequence in the order they are received, the first event sequence may be [E, D, C, B, A]. If the first priorities for events A, B, C, D, and E are determined in step S410 of FIG. 4 to be higher in the order of A, B, D, E, and C, then event order information for events A, B, C, D, and E that sequentially assigns processing priorities, starting from 1, according to the first priorities for events A, B, C, D, and E may be 1 for event A, 2 for event B, 5 for event C, 3 for event D, and 4 for event E. In this example, a second event sequence, which is obtained by sorting events A, B, C, D, and E in descending order of the first priorities, may become [(A, 1), (B, 2), (D, 3), (E, 4), (C, 5)], and the security control decision support system 15 may generate [(A, 1), (B, 2), (D, 3), (E, 4), (C, 5)] as the second event sequence.

Thereafter, the security control decision support system 15 may sort the events included in the first event sequence in descending order of the second priorities, to generate a third event sequence with event order information for each of the events included in the first event sequence (S422). The event order information included in the third event sequence is sequence information sequentially assigning processing priorities, starting from 1, according to the second priorities.

In the previous example with events A, B, C, D, and E, it is assumed that the second priorities for events A, B, C, D, and E are determined, based on the risk level, playbook execution time, and frequency of occurrence of each of events A, B, C, D, and E, to be higher in the order of A, B, C, D, and E. Then, event order information for events A, B, C, D, and E that sequentially assigns processing priorities, starting from 1, according to the second priorities for events A, B, C, D, and E may be 1 for event A, 2 for event B, 3 for event C, 4 for event D, and 5 for event E. In this case, a third event sequence for events A, B, C, D, and E, which is obtained by aligning events A, B, C, D, and E in descending order of the second priorities, may become [(A, 1), (B, 2), (C, 3), (D, 4), (E, 5)], and the security control decision support system 15 may generate [(A, 1), (B, 2), (C, 3), (D, 4), (E, 5)] as the third event sequence.

After the generation of the second and third event sequences, the security control decision support system 15 may determine whether the event order information for an m-th event in the second event sequence and the event order information for the same event in the third event sequence match (S423). Here, m is an integer of 1 or greater and is less than or equal to the number of events included in the first event sequence.

In the example where the first event sequence is [E, D, C, B, A], the second event sequence is [(A, 1), (B, 2), (D, 3), (E, 4), (C, 5)], and the third event sequence is [(A, 1), (B, 2), (C, 3), (D, 4), (E, 5)], the event order information for the first event (i.e., event A) in the second event sequence, which is 1, matches the event order information for event A in the third event sequence, which is also 1.

The event order information for the second event (i.e., event B) in the second event sequence, which is 2, matches the event order information for event b in the third event sequence, which is also 2.

However, the event order information for the third event (i.e., event D) in the second event sequence, which is 3, does not match the event order information for event D in the third event sequence, which is 4.

Additionally, the event order information for the fourth event (i.e., event E) in the second event sequence, which is 4, does not match the event order information for event E in the third event sequence, which is 5.

Furthermore, the event order information for the fifth event (i.e., event C) in the second event sequence, which is 5, does not match the event order information for event C in the third event sequence, which is 3.

According to this embodiment, the security control decision support system 15 can verify whether first priorities determined by a priority decision model match second priorities by determining whether all event order information for events included in a second event sequence match event order information for the respective events included in a third event sequence. Therefore, the reliability of processing priorities determined by the priority decision model is ensured.

The security control decision support system 15 may use the results of the verification to numerically quantify feedback data, which may be used to perform the reinforced training of the priority decision model, thereby enabling the priority decision model to determine the priorities of events more accurately. A method for determining a feedback score for reinforcing the training of a priority decision model will hereinafter be described with reference to FIGS. 7 to 9.

Figure 7:
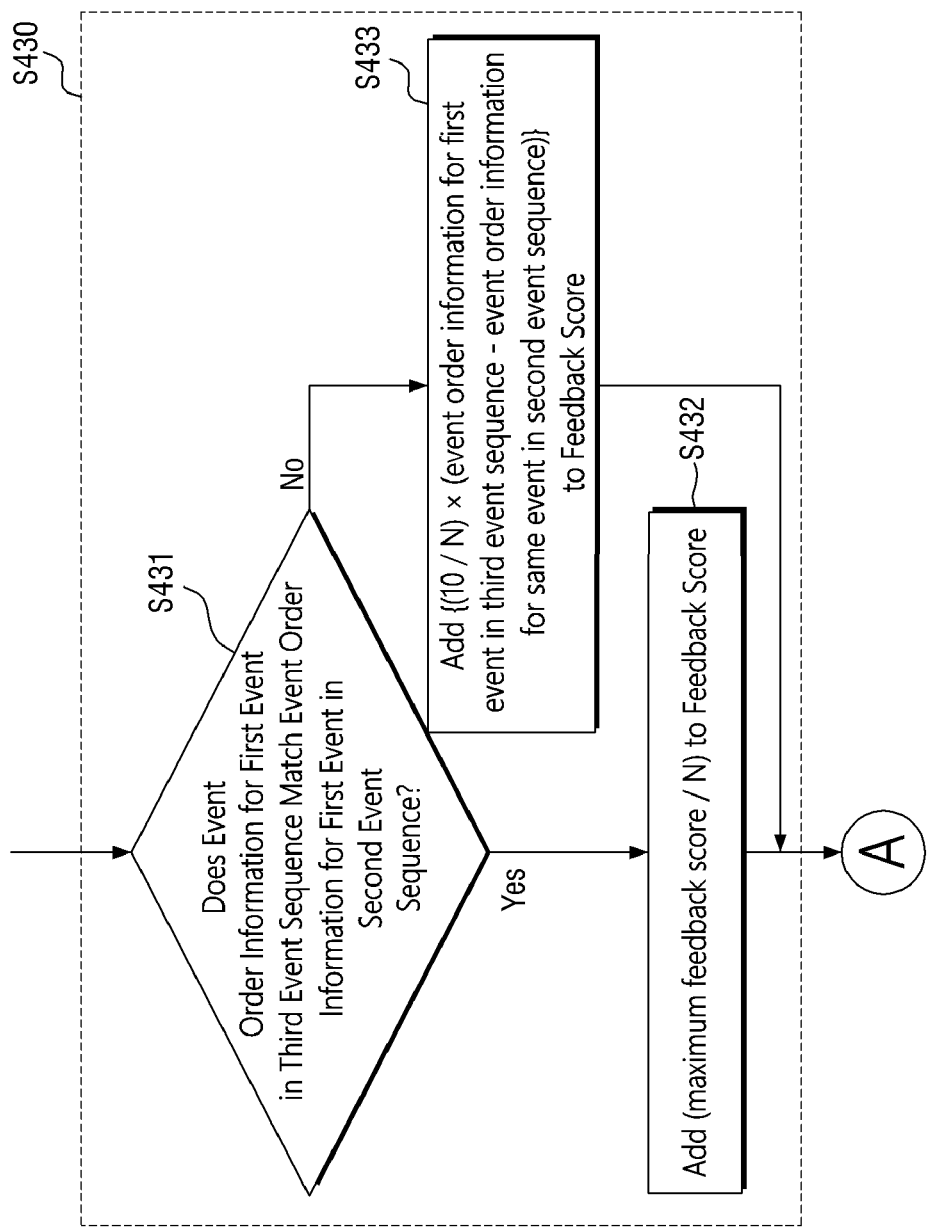
Figure 8:
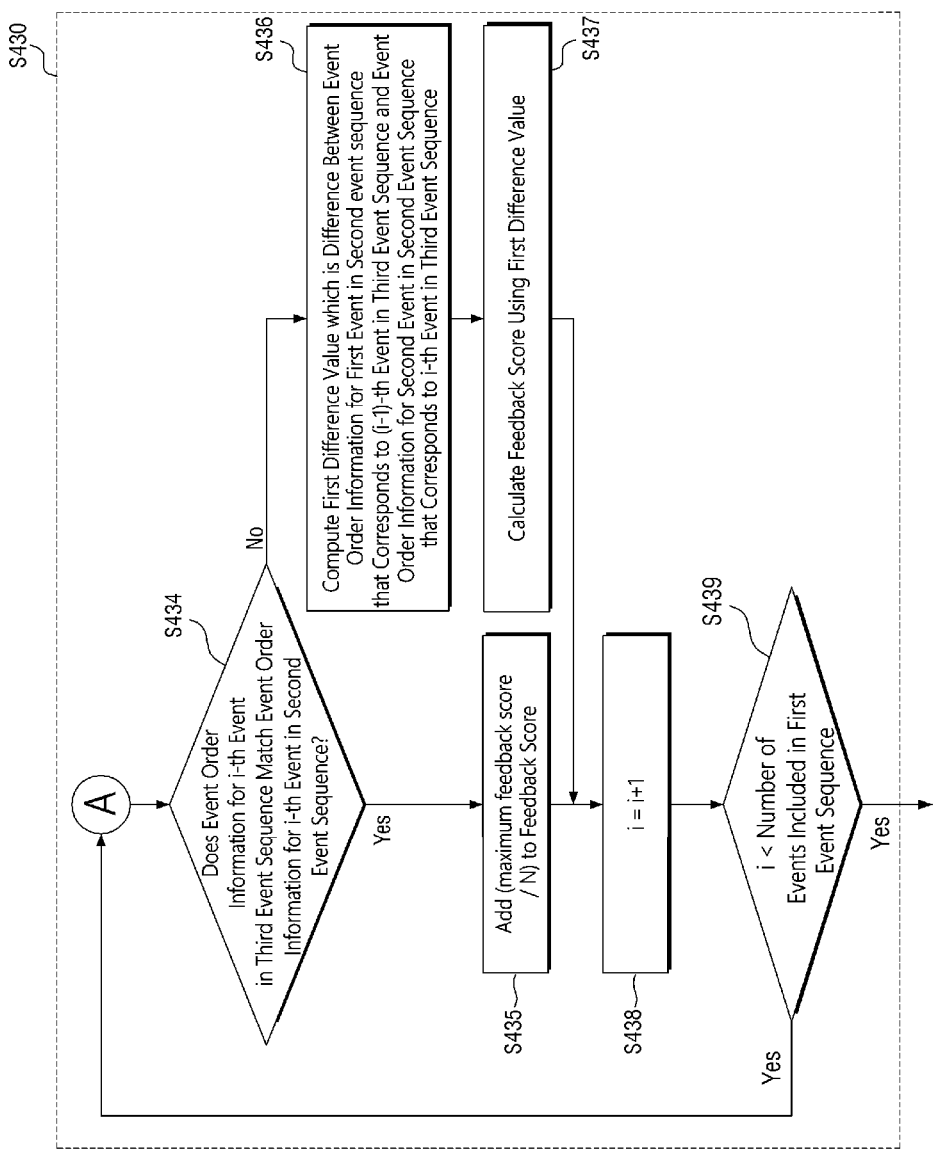

FIGS. 7 and 8 are detailed flowcharts further elaborating the event processing method of FIG. 4.

The value obtained through the steps specified in FIG. 7 and FIG. 8, ranging from S431 to S439, is aggregated, resulting in the feedback score as the final outcome. The feedback score is initially 0 and has a maximum value of 10. When the number of events included in the first event sequence is N, the closer the feedback score is to (2×N), the higher the accuracy of the first priorities determined using the priority decision model.

The embodiment of FIGS. 7 and 8 will hereinafter be described, assuming that the first event sequence is [E, D, C, B, A], the second event sequence is [(A, 1), (B, 2), (D, 3), (E, 4), (C, 5)], and the third event sequence is [(A, 1), (B, 2), (C, 3), (D, 4), (E, 5)].

Referring to FIG. 7, in one embodiment, if the event order information for the first event in the third event sequence matches the event order information for the same event in the second event sequence (S431), the security control decision support system 15 adds (10/N) to the feedback score (S432).

Since the first event in the third event sequence is event A and its event order information is 1, which matches the event order information for event A in the second event sequence that is also 1, the security control decision support system 15 adds 2 (=10/5) to the feedback score so that the feedback score becomes 2.

Conversely, in one embodiment, if the event order information for the first event in the third event sequence does not match the event order information for the same event in the second event sequence (S431), the security control decision support system 15 adds {(10/N)×(event order information for first event in third event sequence−event order information for same event in second event sequence)} to the feedback score (S433).

If the second event sequence is [(B, 1), (D, 2), (A, 3), (E, 4), (C, 5)], then the event order information for event A in the third event sequence is 1, but the event order information for event A in the second event sequence is 3. As the event order information for event A in the third event sequence and the event order information for event A in the second event sequence do not match, the security control decision support system 15 adds −4 (={(10/5)×(1−3)} to the feedback score.

Referring to FIG. 8, the security control decision support system 15 compares the event order information for an i-th event (where i is an integer of 2 or greater) in the third event sequence with the event order information for the same event in the second event sequence and adds a predetermined value to the feedback score calculated in step S430 of FIG. 7 based on the results of the comparison (S434).

In one embodiment, if the event order information for the i-th event in the third event sequence matches the event order information for the same event in the second event sequence, the security control decision support system 15 adds (10/N) to the feedback score (S435). Then, the security control decision support system 15 increments i by 1 (S438) and determines if i is currently less than or the same as the number of events included in the first event sequence (S439). If i is currently less than or the same as the number of events included in the first event sequence, the security control decision support system 15 returns to step S434 and repeats the calculation of the feedback score.

In the example where the first event sequence is [E, D, C, B, A], the second event sequence is [(A, 1), (B, 2), (D, 3), (E, 4), (C, 5)], and the third event sequence is [(A, 1), (B, 2), (C, 3), (D, 4), (E, 5)], the second event in the third event sequence is event B and its event order information is 2. Thus, the event order information for the second event in the third event sequence matches the event order information for the same event (i.e., event B) in the second event sequence, which is also 2. Thus, the security control decision support system 15 adds 2 (=10/5) to the feedback score. In this case, the feedback score becomes 4. Then, the system increments i from 2 to 3. Since i is currently 3 and less than the total number of events included in the first event sequence, which is 5, the security control decision support system returns to step S434 and repeats the calculation of the feedback score.

On the contrary, in one embodiment, if the event order information for the i-th event in the third event sequence does not match the event order information for the same event in the second event sequence, the security control decision support system 15 computes a first difference value, which is the difference between the event order information for the first event in the second event sequence that corresponds to an (i−1)-th event in the third event sequence and the event order information for the second event in the second event sequence that corresponds to the i-th event in the third event sequence (S436). Then, the security control decision support system 15 may calculate the feedback score using the first difference value (S437). Thereafter, the security control decision support system 15 increments i by 1 (S438) and determines whether i is currently less than or the same as the number of events included in the first event sequence (S439). If i is currently less than or the same as the number of events included in the first event sequence, the system returns to step S434 and repeats the calculation of the feedback score.

Figure 9:
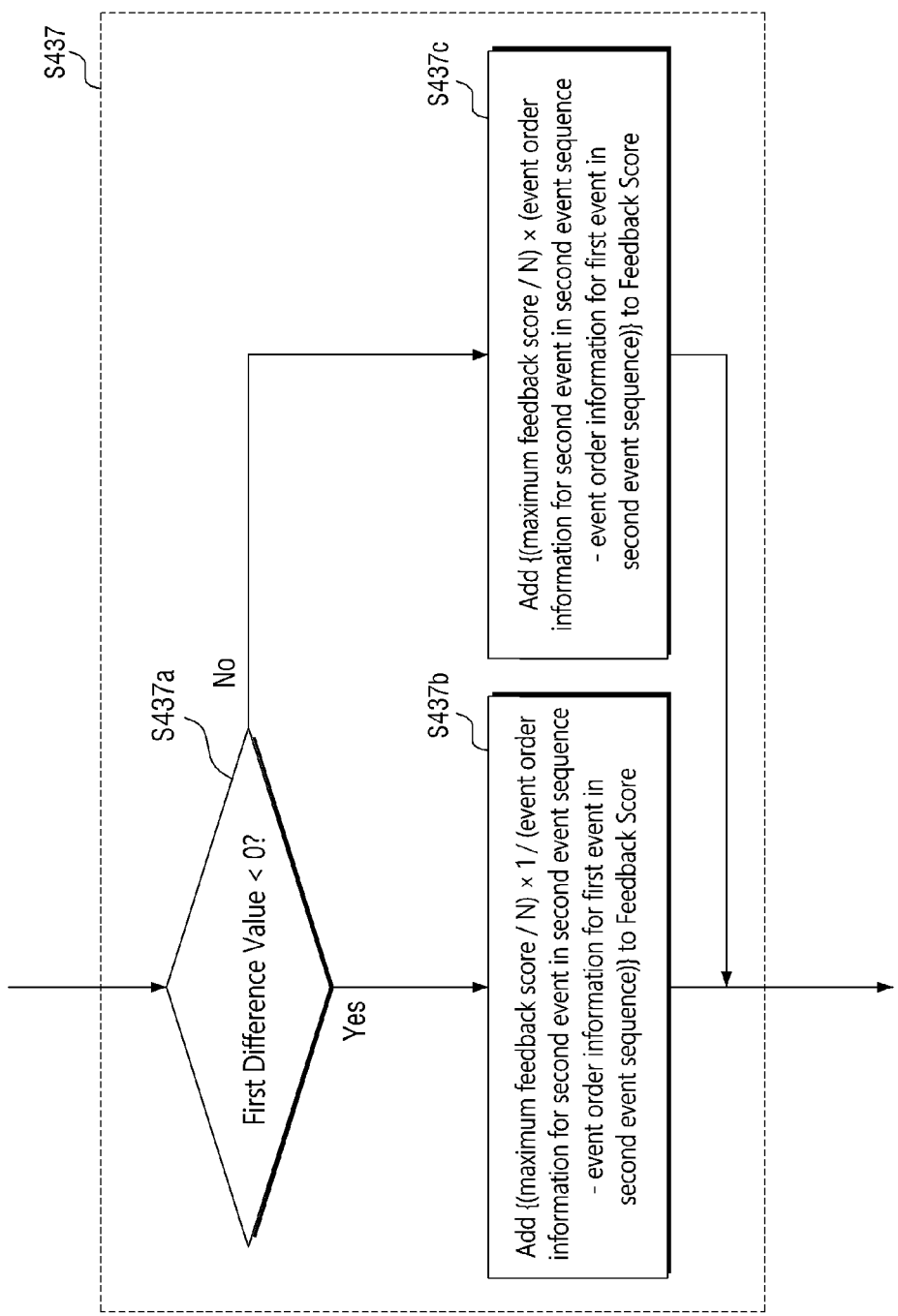
FIG. 9 is a detailed flowchart further elaborating the event processing method of FIG. 8.

The calculation of the feedback score by the security control decision support system 15 using the first difference value will hereinafter be described with reference to FIG. 9. FIG. 9 is a detailed flowchart further elaborating the event processing method of FIG. 8.

Referring to FIG. 9, in one embodiment, if the first difference value is negative (S437*a*), the security control decision support system 15 adds {(maximum feedback score/N)×1/(event order information for second event in second event sequence−event order information for first event in second event sequence)} to the feedback score (S437*b*).

On the other hand, in one embodiment, if the first difference value is positive (S437*a*), the security control decision support system 15 adds {(maximum feedback score/N)× (event order information for second event in second event sequence−event order information for first event in second event sequence)} to the feedback score (S437*c*).

In the example where the first event sequence is [E, D, C, B, A], the second event sequence is [(A, 1), (B, 2), (D, 3), (E, 4), (C, 5)], and the third event sequence is [(A, 1), (B, 2), (C, 3), (D, 4), (E, 5)], the third event in the third event sequence is event C, and its event order information is 3. However, the event order information for the same event (i.e., event C) in the second event sequence is 5 and does not match the event order information for the third event in the third event sequence. Since the second and third events in the third event sequence are events B and C, respectively, and the event order information for event B in the second event sequence and the event order information for event C in the second event sequence are 2 and 5, respectively, the first difference value is −3 (=2−5).

In this case, as the first difference value is negative, the security control decision support system 15 proceeds to step S437b and adds 0.66 (={(10/5)×1/(5−2)}) to the feedback score.

Thereafter, the security control decision support system 15 increments i from 3 to 4. Since i is currently 4 and less than the total number of events included in the first event sequence, which is 5, the security control decision support system 15 returns to step S434 and repeats the calculation of the feedback score.

Since the event order information for the fourth event (i.e., event D) in the third event sequence is 4 and the event order information for the same event in the second event sequence is 3, the event order information for the fourth event in the third event sequence and the event order information for the same event in the second event sequence do not match. Since the third and fourth events in the third event sequence are events C and D, respectively, and the event order information for event C in the second event sequence and the event order information for event D in the second event sequence are 5 and 3, respectively, the first difference value is 2 (=5-3).

In this case, as the first difference value is positive, the security control decision support system 15 proceeds to step S437c and adds −4 (={(10/5)×(3−5)}) to the feedback score.

Thereafter, the security control decision support system 15 increments i from 4 to 5. Since i is currently equal to 5, which is the number of events included in the first event sequence, the security control decision support system 15 returns to step S434 and repeats the calculation of the feedback score.

The fifth event in the third event sequence is event E, and its event order information is 5. However, since the event order information for event E in the second event sequence is 4, the event order information for the fifth event in the third event sequence and the event order information for the same event in the second event sequence do not match. Since the fourth and fifth events in the third event sequence are events D and E, respectively, the event order information for event D in the second event sequence and the event order information for event E in the second event sequence are 3 and 4, respectively, the first difference value is −1 (=3-4).

In this case, as the first difference value is negative, following step S437b, the security control decision support system 15 proceeds to step S437b and adds 2 (={(10/5)×1/(4−3)}) to the feedback score.

Thereafter, the security control decision support system 15 increments i from 5 to 6. As i is currently greater than 5, which is the number of events included in the first event sequence, the security control decision support system 15 proceeds to step S440 and performs reinforced learning for the priority decision model using the feedback score.

According to this embodiment, the security control decision support system 15 can verify first priorities determined for events by a priority decision model, calculate a feedback score for the results of the verification, and use the feedback score as data for a reinforced learning for the priority decision model, thereby enhancing the accuracy of the determined first priorities.

That is, the feedback score can have a maximum of 2×N, and the closer the feedback score is to 2×N, the higher the accuracy of the determined first priorities.

In one embodiment, if the second priorities and the first priorities do not match, the degree of this mismatch may be determined as the feedback score. In this case, the feedback score for the first priorities may vary, and the degree of mismatch between priorities may also vary.

According to this embodiment, the security control decision support system 15 can produce various feedback scores for the results of verification of determined first priorities. This allows for a quantified representation of the extent of error in determined processing priorities, aiding in the reinforced learning for a priority decision model.

Figure 10:
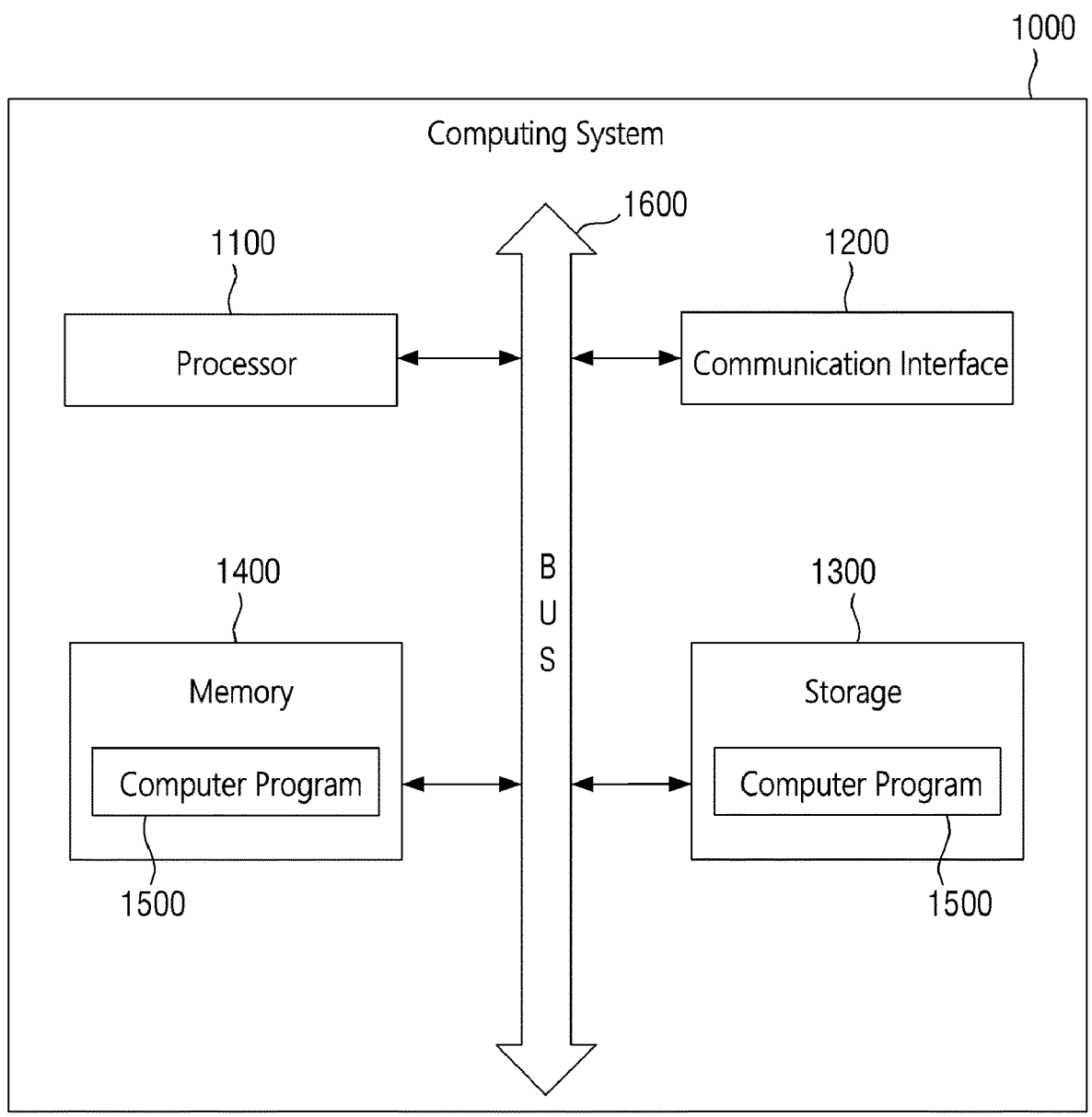
FIG. 10 is a hardware configuration view of a computing system according to some embodiments of the present disclosure.

FIG. 10 is a hardware configuration view of a computing system according to some embodiments of the present disclosure. Referring to FIG. 10, a computing system 1000 may include at least one processor 1100, a system bus 1600, a communication interface 1200, a memory 1400 for loading a computer program 1500 executed by the processor 1100, and a storage 1300 for storing the computer program 1500. For example, the computing system 1000 may be the security control decision support system 15 of FIG. 1.

The processor 1100 controls the overall operations of the components of the computing system 1000. The processor 1100 may perform computations for at least one application or program to execute methods/operations according to various embodiments of the present disclosure. The memory 1400 stores various data, commands, and/or information. The memory 1400 may load one or more computer programs 1500 from the storage 1300 to execute methods/operations according to various embodiments of the present disclosure. The storage 1300 may non-temporarily store at least one computer program 1500. The computer program 1500 may include one or more instructions implemented according to various embodiments of the present disclosure. When loaded into the memory 1400, the processor 1100 may execute these instructions, thereby performing the methods/operations according to various embodiments of the present disclosure.

The computer program 1500 may be a program related to an event processing method.

In one embodiment, the computer program 1500 may execute instructions for receiving events, instructions for determining whether an event processing threshold exceedance has occurred due to the reception of the events by a security control decision support system, instructions for determining processing priorities for the received events if it is determined that the event processing threshold exceedance has occurred, and instructions for deciding to delay the processing of the received events if the processing priorities of the received events are below a predetermined reference level.

In one embodiment, the computer program 1500 may execute: instructions for receiving a plurality of events and generating a first event sequence in which the received events are sequentially arranged; instructions for determining first priorities for the events included in the first event sequence, using data output from a previously trained priority decision model; instructions for verifying the first priorities by comparing the first priorities with second priorities for the events included in the first event sequence; instructions for determining a feedback score for the first priorities based on the results of the verification; and instructions for reinforcing the training of the priority decision model using the feedback score.

In one embodiment, the instructions for determining the first priorities include: instructions for creating a first score for the risk level of each of the events included in the first event sequence, a second score for the importance of detection equipment, and a third score for the frequency of attacks targeted at the destination IP address of each of the events included in the first event sequence; instructions for calculating a first item by multiplying the first score with a first weight, a second item by multiplying the second score with a second weight, and a third item by multiplying the third score with a third weight, wherein the sum of the first, second, and third weights is equal to 1; and instructions for assigning higher priorities to events with larger sums of the first, second, and third items.

In one embodiment, the instructions for creating the first score include instructions for creating the first score using the arithmetic mean value of at least some of 'Damage potential,' 'Reproducibility,' 'Exploitability,' 'Affected users,' and 'Discoverability' values for each of the events included in the first event sequence.

In one embodiment, the second priorities may be determined using data entered by a user terminal based on the risk level, playbook execution time, and frequency of occurrence of each of the events included in the first event sequence.

In one embodiment, the instructions for verifying the first priorities include: instructions for generating a second event sequence with event order information for each of the events included in the first event sequence, by arranging the events included in the first event sequence in descending order of the first priorities; instructions for generating a third event sequence with event order information for each of the events included in the first event sequence, by arranging the events included in the first event sequence in descending order of the second priorities; and instructions for determining whether the event order information for an m-th event (where m is an integer of 1 or greater) in the third event sequence matches the event order information for the same event in the second event sequence.

In one embodiment, the instructions for determining the feedback score include: instructions for adding (maximum feedback score/N) to the feedback score if the event order information for the first event in the third event sequence matches the event order information for the same event in the second event sequence, wherein N is the number of events included in the first event sequence.

In one embodiment, the instructions for determining the feedback score include: instructions for adding {(maximum feedback score/N)×(event order information for first event in third event sequence−event order information for same event in second event sequence)} to the feedback score if the event order information for the first event in the third event sequence does not match the event order information for the same event in the second event sequence, wherein N is the number of events included in the first event sequence.

In one embodiment, the instructions for determining the feedback score may include adding (maximum feedback score/N) to the feedback score if the event order information for an i-th event (where i is an integer of 2 or greater) in the third event sequence matches the event order information for the same event in the second event sequence, wherein N is the number of events included in the first event sequence.

In one embodiment, the instructions for determining the feedback score may include: if the event order information for the i-th event in the third event sequence does not match the event order information for the same event in the second event sequence, instructions for computing a first difference value, which is the difference between the event order information for the first event in the second event sequence that corresponds to an (i−1)-th event in the third event sequence and the event order information for the second event in the second event sequence that corresponds to the i-th event in the third event sequence, and instructions for calculating the feedback score using the first difference value.

In one embodiment, the instructions for calculating the feedback score include: if the first difference value is negative, adding {(maximum feedback score/N)×1/(event order information for second event in second event sequence−event order information for first event in second event sequence)} to the feedback score, wherein N is the number of events in the first event sequence.

In one embodiment, if the first difference value is positive, the instructions for calculating the feedback score include adding {(maximum feedback score/N)×(event order information for second event in second event sequence corresponding to i-th event in third event sequence−event order information for first event in second event sequence corresponding to (i−1)-th event in the third event sequence)} to the feedback score, wherein N is the number of events in the first event sequence.

In some embodiments, the computing system 1000 may be configured using one or more physical servers in a server farm based on a cloud technology such as virtual machines. In this case, some of the processor 1100, the memory 1400, and the storage 1300 may be virtual hardware, and the communication interface 1200 may also be implemented as a virtualized networking element such as a virtual switch.

So far, a variety of embodiments of the present disclosure and the effects according to embodiments thereof have been mentioned with reference to FIGS. 1 to 10. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. An event processing method performed by a computing device, comprising:
receiving events;
determining, by the computing device, whether an event processing threshold exceedance has occurred due to the reception of the events;
if it is determined that the event processing threshold exceedance has occurred, determining processing priorities for the received events; and
if the processing priorities of the received events are below a predetermined reference level, deciding to delay the processing of the received events,
wherein the determining the processing priorities for the received events comprises: creating, by the computing device, a first score for the risk level of each of the events, a second score for the importance of detection equipment, and a third score for the frequency of attacks targeted at a destination IP address of each of the events; calculating a first item by multiplying the first score with a first weight, a second item by multiplying the second score with a second weight, and a third item by multiplying the third score with a third weight, wherein a sum of the first, second, and third weights is equal to 1; and assigning higher priorities to events with larger sums of the first, second, and third items.

2. The event processing method of claim 1, wherein the creating the first score, comprises calculating the first score using an arithmetic mean value of 'Damage potential,' 'Reproducibility,' 'Exploitability,' 'Affected users,' and 'Discoverability' values for each of the events.

3. An event processing method performed by a computing device, comprising:
receiving a plurality of events and generating a first event sequence in which the received events are sequentially arranged;
determining first priorities for the events included in the first event sequence, using data output from a previously trained priority decision model;
verifying the first priorities by comparing the first priorities with second priorities for the events included in the first event sequence;
determining a feedback score for the first priorities based on results of the verification; and
reinforcing the training of the priority decision model using the feedback score,
wherein the determining the first priorities comprises: creating a first score for the risk level of each of the events included in the first event sequence, a second score for the importance of detection equipment, and a third score for the frequency of attacks targeted at a destination IP address of each of the events included in the first event sequence; calculating a first item by multiplying the first score with a first weight, a second item by multiplying the second score with a second weight, and a third item by multiplying the third score with a third weight, wherein the sum of the first, second, and third weights is equal to 1; and assigning higher priorities to events with larger sums of the first, second, and third items.

4. The event processing method of claim 3, wherein the creating the first score, comprises creating the first score using an arithmetic mean value of 'Damage potential,' 'Reproducibility,' 'Exploitability,' 'Affected users,' and 'Discoverability' values for each of the events included in the first event sequence.

5. The event processing method of claim 3, wherein the second priorities are determined using data entered by a user terminal based on the risk level, playbook execution time, and frequency of occurrence of each of the events included in the first event sequence.

6. The event processing method of claim 3, wherein the verifying the first priorities, comprises: generating a second event sequence with event order information for each of the events included in the first event sequence, by arranging the events included in the first event sequence in descending order of the first priorities; generating a third event sequence with event order information for each of the events included in the first event sequence, by arranging the events included in the first event sequence in descending order of the second priorities; and instructions for determining whether the event order information for an m-th event (where m is an integer of 1 or greater) in the third event sequence matches the event order information for the same event in the second event sequence.

7. The event processing method of claim 6, wherein the determining the feedback score, comprises: adding (maximum feedback score/N) to the feedback score if event order information for a first event in the third event sequence matches event order information for the same event in the second event sequence, wherein N is a number of events included in the first event sequence.

8. The event processing method of claim 6, wherein the determining the feedback score, comprises: adding {(maximum feedback score/N)×(event order information for first event in third event sequence−event order information for same event in second event sequence)} to the feedback score if the event order information for the first event in the third event sequence does not match the event order information for the same event in the second event sequence, wherein N is a number of events included in the first event sequence.

9. The event processing method of claim 6, wherein the determining the feedback score, comprises adding (maximum feedback score/N) to the feedback score if event order information for an i-th event (where i is an integer of 2 or greater) in the third event sequence matches event order information for the same event in the second event sequence, wherein N is a number of events included in the first event sequence.

10. The event processing method of claim 6, wherein the determining the feedback score, comprises, if event order information for an i-th event (where i is an integer of 2 or greater) in the third event sequence does not match event order information for the same event in the second event sequence, computing a first difference value, which is a difference between event order information for a first event in the second event sequence that corresponds to an (i−1)-th event in the third event sequence and event order information for a second event in the second event sequence that corresponds to the i-th event in the third event sequence, and calculating the feedback score using the first difference value.

11. The event processing method of claim 10, wherein the calculating the feedback score, comprises, if the first difference value is negative, adding {(maximum feedback score/N)×1/(event order information for second event in second event sequence−event order information for first event in second event sequence)} to the feedback score, wherein N is a number of events in the first event sequence.

12. The event processing method of claim 10, wherein the calculating the feedback score, comprises, if the first difference value is positive, adding {(maximum feedback score/N)×(event order information for second event in second event sequence corresponding to the i-th event in the third event sequence−event order information for first event in second event sequence corresponding to (i−1)-th event in third event sequence)} to the feedback score, wherein N is a number of events in the first event sequence.

13. The event processing method of claim 3, wherein the determining the feedback score, comprises, if the second priorities do not match the second priorities, determining a degree of mismatch between priorities that has multiple values, if the degree of mismatch between priorities has a first value, determining the feedback score as a first feedback score, and if the degree of mismatch between priorities has a second value, determining the feedback score as a second feedback score.

14. An event processing system comprising:
a communication interface;
a memory having a computer program loaded therein; and
at least one processor executing the computer program,
wherein the computer program executes: instructions for receiving a plurality of events and generating a first event sequence in which the received events are sequentially arranged; instructions for determining first priorities for the events included in the first event sequence, using data output from a previously trained priority decision model; instructions for verifying the first priorities by comparing the first priorities with second priorities for the events included in the first event sequence; instructions for determining a feedback score for the first priorities based on results of the verification; and instructions for reinforcing the training of the priority decision model using the feedback score,
wherein the instructions for determining first priorities comprise: instructions for creating a first score for the risk level of each of the events included in the first event sequence, a second score for the importance of detection equipment, and a third score for the frequency of attacks targeted at a destination IP address of each of the events included in the first event sequence; instructions for calculating a first item by multiplying the first score with a first weight, a second item by multiplying the second score with a second weight, and a third item by multiplying the third score with a third weight, wherein the sum of the first, second, and third weights is equal to 1; and instructions for assigning higher priorities to events with larger sums of the first, second, and third items.

15. An event processing system comprising:
a server outputting a plurality of events generated by an external attack;
security equipment collecting the events from the server to perform a security control process, and sending a support request signal to a security control decision support system if a number of occurred events exceeds an event processing threshold; and
the security control decision support system receiving the support request signal, determining priorities for the events, verifying the determined priorities, and transmitting information on the verified priorities to the security equipment,
wherein the security control decision support system further receives the events from the security equipment, generates a first event sequence where the events are sequentially arranged, determines first priorities for the events included in the first event sequence, and verifies the first priorities by comparing the first priorities with second priorities for the events included in the first event sequence, and
the first priorities are determined data output from a previously trained priority decision model,
wherein the security control decision support system creates a first score for the risk level of each of the events included in the first event sequence, a second score for the importance of detection equipment, and a third score for the frequency of attacks targeted at a destination IP address of each of the events included in the first event sequence, calculates a first item by multiplying the first score with a first weight, a second item by multiplying the second score with a second weight, and a third item by multiplying the third score with a third weight, wherein the sum of the first, second, and third weights is equal to 1 and assigns higher priorities to events with larger sums of the first, second, and third items.

16. The event processing system of claim 15, wherein the security control decision support system determines a feedback score for the first priorities using results of the verification and performs reinforced learning for the priority decision model using the feedback score.

* * * * *